United States Patent Office 3,259,457
Patented July 5, 1966

3,259,457
ZINC HYDROSULFITE SOLUTIONS WITH INCREASED STABILITY AND PROCESSES FOR THE PRODUCTION THEREOF
Thomas W. Sauls and Ernest A. Winter, College Park, Ga., assignors, by mesne assignments, to Tennessee Corporation, New York, N.Y., a corporation of Delaware
No Drawing. Filed June 12, 1962, Ser. No. 201,778
2 Claims. (Cl. 23—116)

This invention relates to zinc hydrosulfite solutions having increased stability to decomposition and to processes for the production thereof.

Zinc hydrosulfite has long been an article of commerce, and is used primarily in the textile and paper industries as a bleaching agent. A known process for its manufacture is to absorb sulfur dioxide gas in a slurry of zinc dust and water while keeping the temperature at about 40–50° C. The resulting solution of $ZnS_2O_4$ (usually about 38–40%) can be used at once for bleaching, but its useful life is limited to a short period of from 24–48 hours at 25° C. before drastic decomposition renders the solution useless.

This inherent instability of $ZnS_2O_4$ solution heretofore has required users either to—
(1) Purchase dry powder or flake of $ZnS_2O_4$ or
(2) Prepare solutions continuously as required.

Dry $ZnS_2O_4$ is very costly due to greatly increased manufacturing and packaging costs.

Preparation of $ZnS_2O_4$ solutions by a user may be undesirable due to space, labor, and technical requirements.

The present invention overcomes these difficulties and provides novel stabilized concentrated solutions of $ZnS_2O_4$ and processes for making them, which solutions can be readily transported to a user such as a textile or paper mill. These novel solutions have an effective life of at least a week or more before drastic decomposition begins. These stabilized solutions result in substantial savings to the user compared to a dry $ZnS_2O_4$ product and relieve the user of the burden of manufacturing $ZnS_2O_4$ solutions as needed.

A normal 38% solution of freshly prepared $ZnS_2O_4$ will decompose drastically in less than 48 hours at room temperature (25–30° C.). At higher temperatures decomposition is even more rapid. Most unexpectedly, we have discovered that by incorporating ZnO, Zn dust, and hydroquinone in the proper amounts, a normal solution of $ZnS_2O_4$ can be preserved for periods up to 16 days before drastic decomposition begins. The following effects are obtained by these components:

ZnO—buffers the solutions by neutralizing acids as they are formed.

Zn dust—maintains a reducing condition in the solution by reforming $ZnS_2O_4$ from $SO_2$ given off due to decomposition.

Hydroquinone—serves as an antioxidant and displays an unexpected and synergistic effect with the ZnO and Zn dust.

It is therefore an object of the present invention to provide novel stabilized zinc-hydrosulfite solutions and processes for producing them in which decomposition of the solution is prevented for extended periods of time by the synergistic effect of the addition of hydroquinone, ZnO and Zn dust to the solution.

British Patent No. 348,776 suggests the addition of Zn dust and ZnO to zinc-hydrosulfite solutions to increase their stability. As will be seen from the following examples, the present invention, most unexpectedly, provides a synergistic effect when hydroquinone is added with Zn dust and ZnO to the solution to at least double the life of the solution before decomposition commences over any extended period of stability provided by the addition of Zn dust and ZnO.

The stabilizing components can be added to the zinc hydrosulfite solution in varying amounts within the scope of the present concept and the processes for obtaining stabilized zinc hydrosulfite solutions of the present invention may be carried out with various procedural changes within the inventive concept. The examples of the present invention which follow are therefore illustrative only and should in no way be construed as defining or limiting the invention.

In Table I which follows zinc hydrosulfite solutions were prepared and tested for stability against decomposition. The data of this table was obtained by the following processes and testing procedures:

*Preparation and testing samples.*—A slurry of 133 g. Zn dust and 500 ml. of distilled water was stirred while absorbing approximately 248 g. of $SO_2$ gas while stirring and cooling to keep the temperature at 40° C. during a 1½–2 hours period resulting in a 38% solution of $ZnS_2O_4$. Those runs containing antioxidants had this material added with the zinc dust prior to reaction.

The excess zinc dust and zinc oxide are added after $SO_2$ has been absorbed to a light gray to cream colored end-point. An initial representative sample of 10 ml. of the slurry was taken after 15 minutes, weighed accurately (to the mg.) and added to 25 ml. formaldehyde solution before diluting to 250 ml. volume. After shaking 15 minutes a 10 ml. aliquot was acidified with acetic acid and titrated with 0.1 N $I_2$ solution. The initial strength of the slurry was calculated as ml. 0.1 N $I_2$/g. slurry. Samples were taken at approximately 24 hour intervals under varying conditions to determine the rates of decomposition. Particular care was used to obtain a representative sample of these thick slurries.

TABLE I
[38% solution of $ZnS_2O_4$ in water]

| Run No. | Stabilizers | Average temperature, °C. | Life in days until rapid decomposition | Average decomposition per day (percent) |
|---|---|---|---|---|
| 1 | None | 28 | 2 | 6.0 |
| 2 | 1% ZnO | 28 | 5 | 2.4 |
| 3 | 1% Hydroquinone | 27 | 5 | 2.4 |
| 4 | 2% ZnO, .3% Zn | 25 | 7 | 1.7 |
| 5 | 2% ZnO, .3% Zn, 0.5% Hydroquinone. | 24 | 16 | 0.75 |
| 6 | 1% ZnO, 0.06% Zn, 0.25% Hydroquinone. | 26 | 7 | 1.7 |
| 7 | 1% ZnO, 0.06% Zn, 1% Hydroquinone. | 27 | 11 | 1.0 |
| 8 | 1% ZnO, 0.06% Zn, 0.5% Hydroquinone. | 27 | 7 | 1.7 |
| 9 | 2% ZnO, 0.3% Zn, 1% Hydroquinone. | 26 | 14 | 0.85 |
| 10 | 2% ZnO, 0.3% Zn, 0.25% Hydroquinone. | 26 | 7 | 1.70 |

From the results of Table I it will be observed that the zinc hydrosulfite solutions have maximum increased stability and the synergistic effect of the addition of hydroquinone is at a maximum when the ZnO is present in a range of from approximately 1–2%; when Zn dust is present in the approximate range of 0.06–0.3%; and when hydroquinone is added in the approximate range of 0.25–1%.

It should now be apparent to those skilled in the art that the present invention in every way satisfies the several objectives discussed above.

Changes in or modifications to the above described illustrative stabilized solutions and processes may now be suggested without departing from the present invention. Reference should therefore be had to the appended claims to determine the scope of the present inventive concept.

What is claimed is:

1. Stabilized solutions of zinc hydrosulfite consisting of approximately 38% $ZnS_2O_4$ and about 1–2% ZnO, about 0.06–0.3% zinc dust, and about 1.0% hydroquinone and the balance water.

2. In a process for stabilizing $ZnS_2O_4$ solutions against decomposition, the step of adding to a freshly prepared solution of approximately 38% $ZnS_2O_4$ about 1–2% ZnO, about .06–0.3% zinc dust, and about 1.0% hydroquinone.

References Cited by the Examiner
UNITED STATES PATENTS

| | | | |
|---|---|---|---|
| 1,975,443 | 10/1934 | Bazlen et al. | 23—147 |
| 2,121,397 | 6/1938 | Downing et al. | 23—116 |

OSCAR R. VERTIZ, *Primary Examiner.*

MAURICE A. BRINDISI, *Examiner.*

E. C. THOMAS, *Assistant Examiner.*